UNITED STATES PATENT OFFICE.

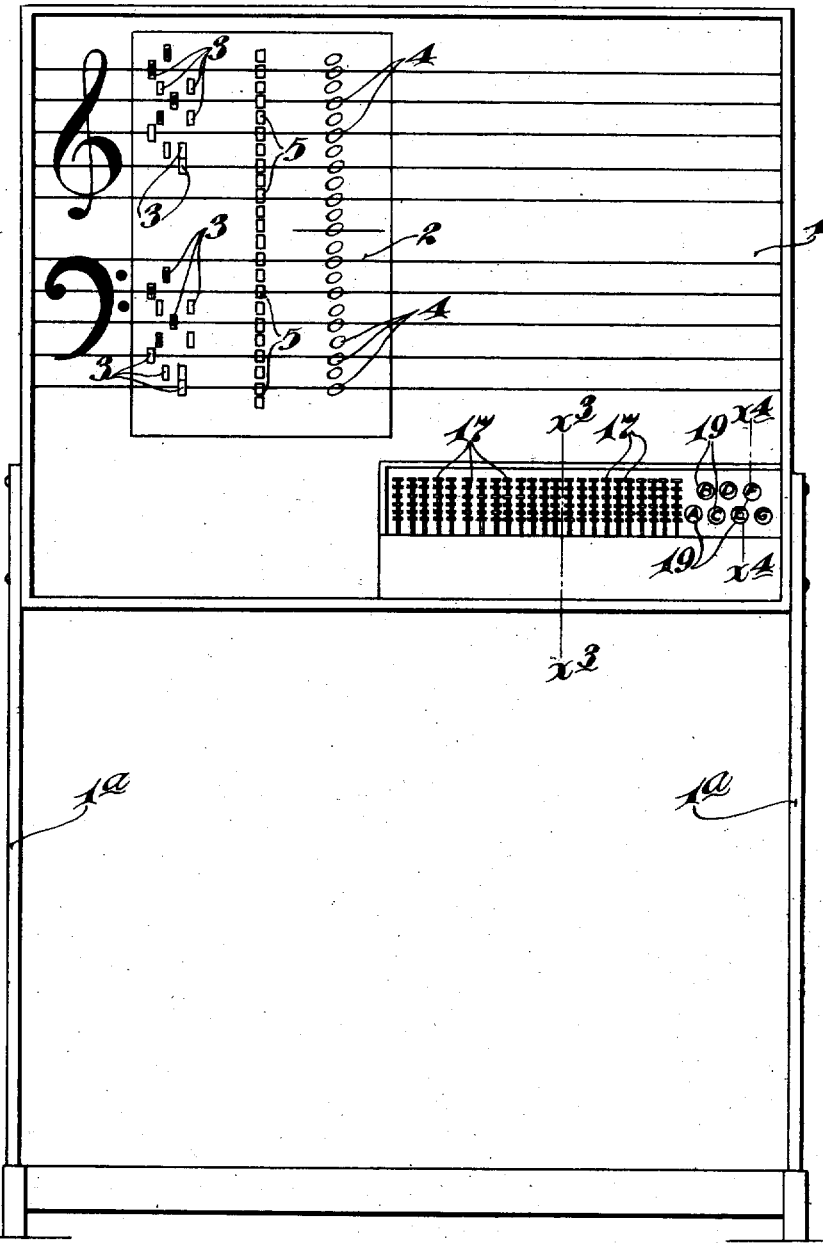

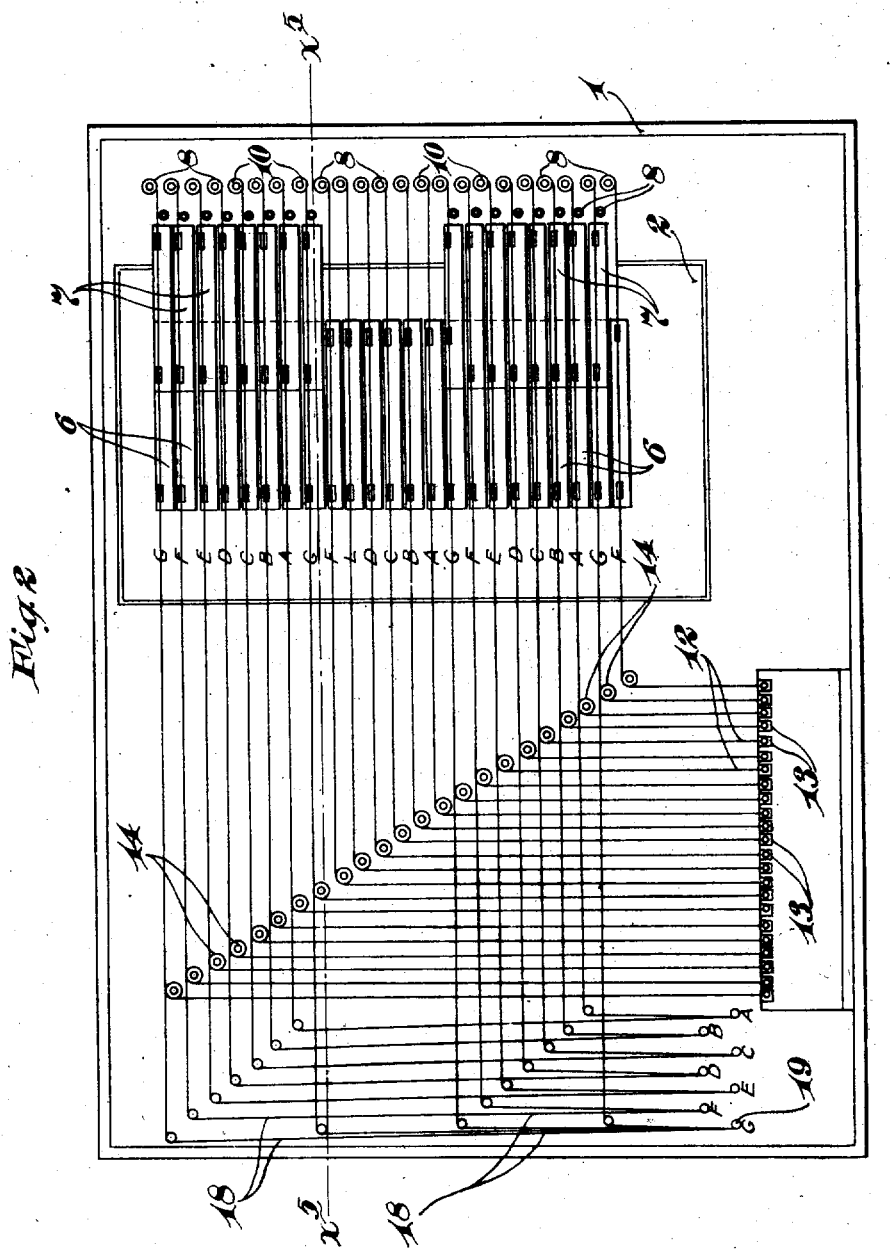

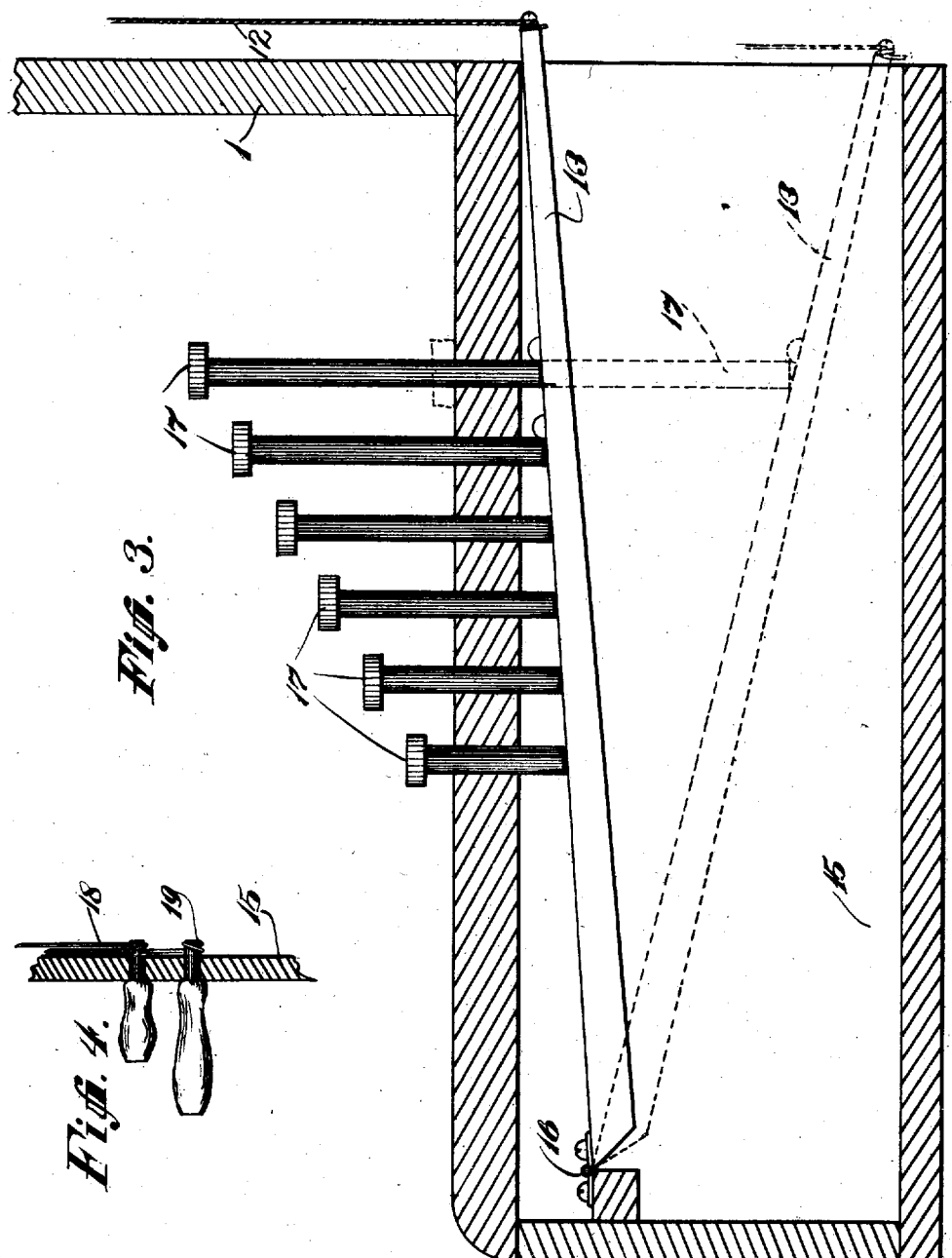

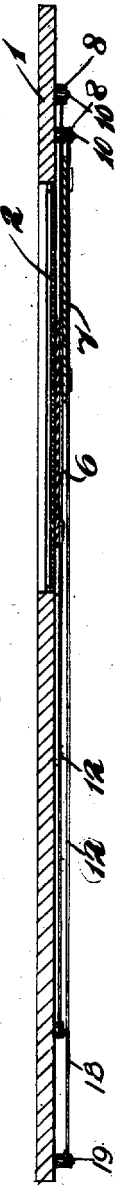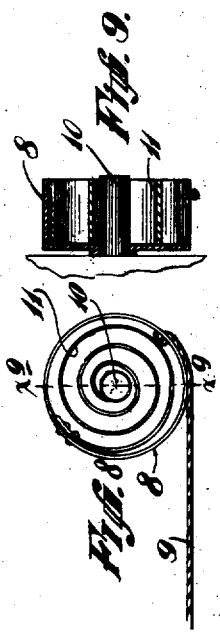

ANDREW L. SKOOG, OF MINNEAPOLIS, MINNESOTA.

KEY-CONTROLLED MUSIC-INSTRUCTION BOARD.

972,934.  Specification of Letters Patent.  Patented Oct. 18, 1910.

Application filed April 5, 1909. Serial No. 487,844.

*To all whom it may concern:*

Be it known that I, ANDREW L. SKOOG, a citizen of the United States, residing at Minneapolis, in the county of Hennepin and State of Minnesota, have invented certain new and useful Improvements in Key-Controlled Musical-Instruction Boards; and I do hereby declare the following to be a full, clear, and exact description of the invention, such as will enable others skilled in the art to which it appertains to make and use the same.

My invention has for its object to provide a simple and highly efficient key controlled music instruction board, especially adapted for use in teaching the rudiments of music and harmony in class work.

To the above ends, the invention consists of the novel devices and combinations of devices hereinafter described and defined in the claims.

Hitherto, in teaching sight singing and harmony, it has been customary to use a blackboard with musical staff and to mark the key signatures and the notes making up chords and musical progressions on such blackboard. This is a slow process and requires repeated erasures. By the use of my improved key controlled instruction board, the various signatures and the various notes may be made to quickly appear on the board and these may be changed in rapid succession as required without the use of either chalk or eraser.

In the accompanying drawings, which illustrate the invention, like characters indicate like parts throughout the several views.

Referring to the drawings, Figure 1 is a view in front elevation, showing the complete apparatus; Fig. 2 is a rear elevation of the main portion of the apparatus, some parts being indicated in diagram only; Fig. 3 is an enlarged vertical section taken on the line $x^3$ $x^3$ of Fig. 1; Fig. 4 is a detail in vertical section, taken on the line $x^4$ $x^4$ of Fig. 1; Fig. 5 is a horizontal section taken on the line $x^5$ $x^5$ of Fig. 2; Fig. 6 is a detail view in elevation, with some parts broken away, showing one of the note strips; Fig. 7 is a detail view in elevation, some parts being broken away, showing one of the signature strips; Fig. 8 is a detail in rear elevation, showing one of the spring actuated drums, which are provided one for each of the note strips and one for each of the signature strips; and Fig. 9 is a section taken on the line $x^9$ $x^9$ of Fig. 8.

The demonstrating board, which is preferably a blackboard, but which may be of any other desired color, is preferably made up of an upright main board 1 provided with a section 2 set into the same and preferably also painted black. As shown, the board 1 is supported by standards $1^a$. The complete board is preferably marked to indicate both the bass and treble staffs with corresponding clefs; and sight openings, in which the key signatures, the natural notes and accidentals are made to appear, are preferably formed in the section 2. Furthermore, this section 2 is preferably made of glass or transparent material painted black but having transparent places therein properly positioned to afford the desired sight openings. The sight openings, properly positioned to indicate the signatures of different keys, both sharps and flats, are indicated by the numeral 3, the sight openings for indicating natural tones are indicated by the numeral 4 and the sight openings for indicating accidentals are indicated by the numeral 5. The said sight openings might, however, be formed by perforations in a sheet of metal or other opaque material. As shown, there are twenty-three of the sight openings 4, and twenty three of the sight openings 5. There are twenty-two of the signature sight openings 3 arranged in sixteen different horizontal lines. For coöperation with the above noted sight openings there are provided twenty-three note strips 6 and sixteen signature strips 7. The note strips 6 are provided with intermediate white portions and with black end portions $6^a$ and $6^b$, and on the black portions $6^b$, in white characters, are marked notations indicating a sharp, flat, natural, double sharp and double flat, as best shown in Fig. 6. The end portions of the signature strips 7 are white and the intermediate portions thereof are black, as indicated at $7^a$, and on the black portions $7^a$ are white characters, indicating a flat and a sharp, as best shown in Fig 7.

By reference to Fig. 1, it will be noted that each of the sight openings 4 is horizontally alined with one of the sight openings 5. The note strips are mounted for horizontal sliding movements on the back of the board section 2 and each is arranged for coöperation with each horizontally alined pair of sight openings 4 and 5. The signature strips 7 are likewise mounted for horizontal sliding movements on the back of the board section 2, and these are alined with at least one of the sight openings 3 and, in instances where two of the sight openings 3 are horizontally alined, one signature strip coöperates with them both. Normally, the black body portions of the signature strips 7 are located behind the signature sight openings 3, and black portions of the note strips 6 are alined with the perforations 4 and 5, so that the entire face of the board section 2 normally appears black or blank.

The various characters or notations on the strips 6 and 7 are brought into registration with the coöperating sight openings 3, 4 and 5, by imparting the proper differential movements to the said strips, and these differential movements may be imparted to the said strips by suitable keys and coöperating levers. The said strips 6 and 7 are yieldingly held in their normal positions, as above described, preferably by small spring actuated drums 8, to which, as shown, they are connected by small cords or other light flexible connections 9. The drums 8, as shown, are loosely journaled on studs 10 rigidly supported on the back of the board 1, and the said drums are wound by springs 11 secured thereto at their outer ends and anchored, at their inner ends, to the coöperating studs 10, as shown in Figs. 8 and 9. The extended ends of the note strips 6 are connected by cords, wires or other flexible connections 12, each to the free rear end of a lever 13. The intermediate portions of said cords 12 are shown as passed over small guide sheaves 14 suitably mounted on the back of the board 1. In the apparatus shown, wherein there are twenty-three of the note strips 7, twenty-three of the levers 13 are also provided, and these are arranged to work within a box-like extension 15 of the board 1 and at their forward ends are hinged thereto at 16. Again referring to Fig. 6, it will be noted that on each note strip 6 there are five different musical characters which, with the normally black or blank portion, require six differentially operated keys for each lever 13. These keys, which are indicated by the numeral 17, are arranged for vertical movements through the top plate or box extension 15. By reference to Fig. 3, which shows one of the twenty-three sets of these keys 17, it will be noted that, in a direction from the front toward the rear, the stems of the keys 17 are progressively longer and longer, so that when depressed to their limits, they will impart different movements to the coöperating lever 13. More specifically stated, the action of these keys 17 in the particular arrangement illustrated, is as follows: When the short front key 17 is depressed, the corresponding strip 6 will be moved far enough to bring the white intermediate portion of the coöperating strip 6 back of the corresponding natural note sight opening 4, but it will not move said strip far enough to bring the sharp designation of said strip into registration with the accidental sight opening 5. Hence, when the short front key 17 is depressed, a natural note will be made to appear in the corresponding sight opening 4. It should here be stated that the white intermediate portion of the strip 6 is of such length that, it will always appear back of the corresponding sight opening 4, no matter which one of the keys 17 may be depressed. When the second key 17 from the front is depressed, the sharp designation will appear in the corresponding accidental sight opening 5; when the third key 17 is depressed, the flat designation will appear in the said accidental sight opening 5; when the fourth key is depressed, the natural designation will appear in the said opening 5; when the fifth key is depressed, the double sharp designation will appear in the said opening 5; and, when the sixth or rearmost key 17 is depressed, the double flat designation will appear in the said opening 5.

As is evident, by depressing the proper key, or the proper combinations of keys 17, any desired note or notes representing any desired chord, either in the bass or treble clef, or both, may be made instantly to appear, on the face of the board. It is also evident that, as illustrated, whenever a key 17 is released from the pressure of the finger, it and the coöperating note strips 6 will be restored to normal positions by the coöperating spring actuated drum 8. This quickness of action is especially desirable in the teaching of sight singing, where various notes and chords should be made to appear in rapid succession. The means for actuating the signature strips 7, however, should be arranged to hold the said strips in set positions for a greater or less period of time, depending on the length of demonstration in any particular key. Hence, as a simple and convenient means for accomplishing this result, the extended ends of the said signature strips 7 are connected by cords or other light flexible connections 18 to the pegs or rotary keys 19 that are rotatively mounted but frictionally held in suitable seats formed in the front plate or box extension 15. These keys 19 may be given the required rotation necessary to bring either the flat or sharp of the corresponding slide 7 into alinement with the proper coöperating signature sight opening 3. The friction between the key and the board on which it is mounted will hold the coöperating strip 7 in its set position against the tension of its spring actuated drum, and when the signature strip is to be restored to normal position, its actuating key must be given a reverse rotation. Any other suitable means may be provided for temporarily holding the signature strips in different positions, as above stated.

What I claim is:

1. In a device of the kind described, the combination with a board marked to indicate a musical staff and clef and having several series of sight openings, the one series being arranged for key signatures, another series being arranged for natural notes and another series being arranged for accidentals, of a multiplicity of independently movable note strips having characters or marks arranged for coöperation with said natural note and accidental sight openings, key controlled means for imparting different movements to said strips, another series of independently movable signature strips marked with sharps and flats for coöperation with said signature sight openings, and means for moving said signature strips.

2. In a device of the kind described, the combination with a board marked to indicate a musical staff and clef and having several series of sight openings, the one series being arranged for natural notes, another series being arranged for accidentals and the other series being arranged for key signatures, a series of independently movable note strips each marked for coöperation with said natural note and accidental sight openings, a lever connected to each note strip, a series of differentially acting keys for operating on each lever, another series of independently movable signature strips marked with sharps and flats arranged for coöperation with said signature sight openings, and means for imparting differential movements to said signature strips.

3. In a device of the kind described, the combination with a board marked to indicate a musical staff and clef and having several series of sight openings, one series designating natural notes, another series designating accidentals and the third series designating key signatures, of a multiplicity of independently movable note strips each marked for coöperation with said natural note and accidental sight openings, another series of independently movable signature strips marked for coöperation with said signature sight openings and spring devices yieldingly holding said note and accidental strips in normal positions, levers connected to each of said note strips, a series of keys capable of different movements on each lever, and keys with connections to said signature strips, the latter being arranged to be temporarily set in different positions.

In testimony whereof I affix my signature in presence of two witnesses.

ANDREW L. SKOOG.

Witnesses:
ALICE V. SWANSON,
HARRY D. KILGORE.